June 30, 1953     I. NESSON     2,643,410
WIPER BLADE CLIP
Filed Jan. 25, 1949     2 Sheets-Sheet 2
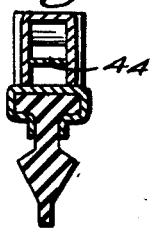 
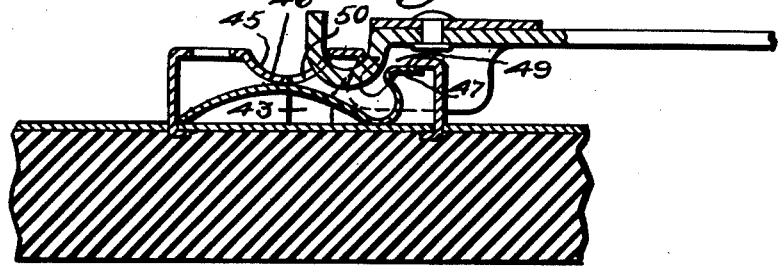
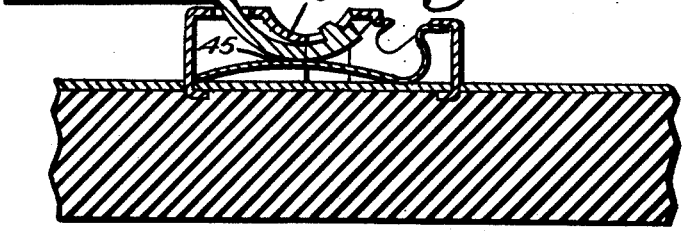
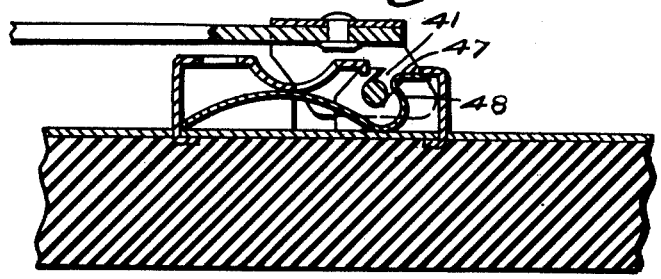
Inventor:
Israel Nesson,
by Thomson & Thomson
Attorneys Patented June 30, 1953

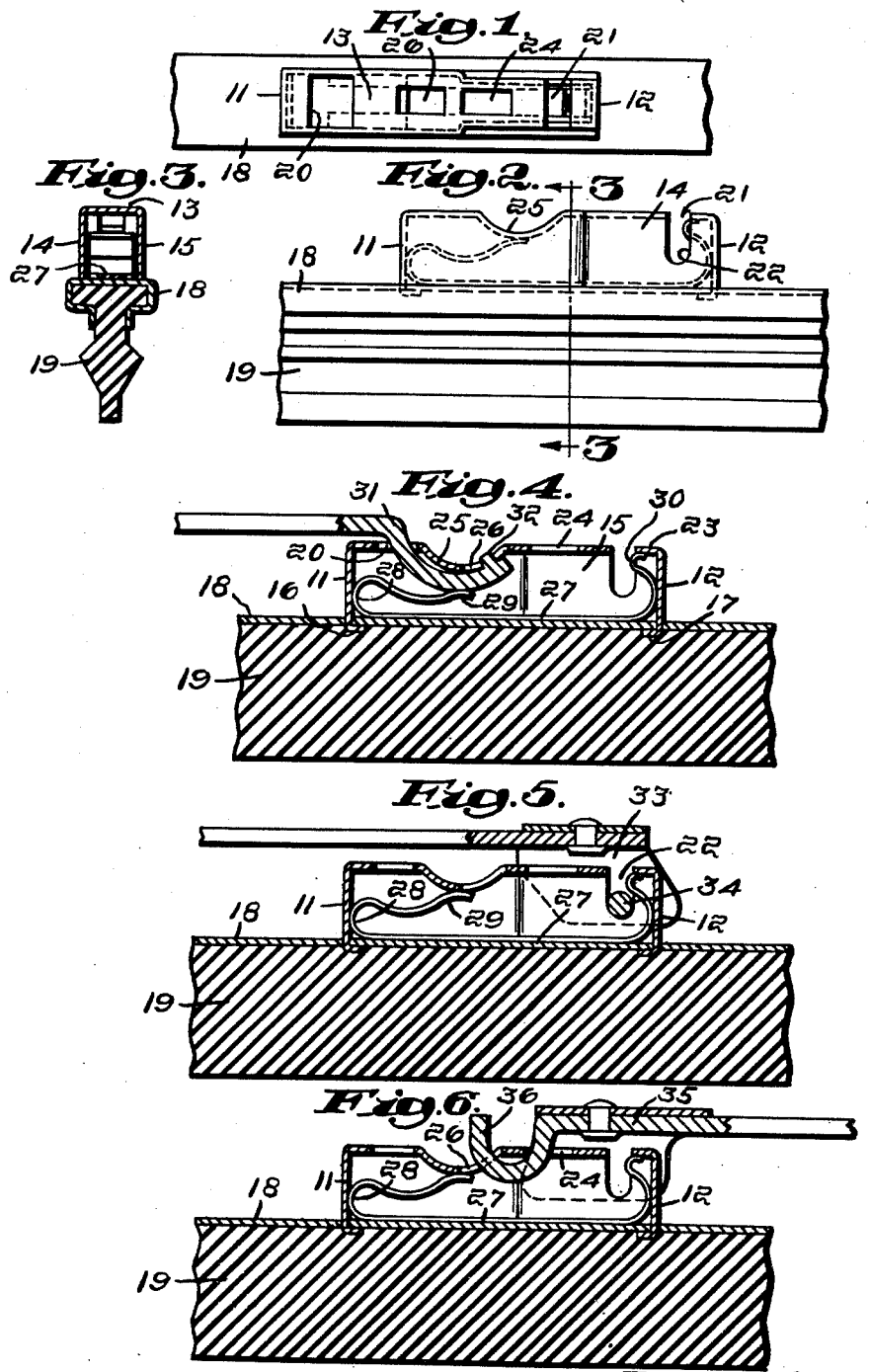

2,643,410

UNITED STATES PATENT OFFICE 2,643,410

WIPER BLADE CLIP

Israel Nesson, Lynn, Mass., assignor to Max Zaiger, Swampscott, Mass.

Application January 25, 1949, Serial No. 72,569

5 Claims. (Cl. 15—250)

This invention relates to clips or connectors applied to windshield wiper blades for attaching the end of the oscillating windshield wiper arm. The principal purpose of the invention is to provide a simple and economical form of connector which may be suitably attached to the wiper blade and which is so constructed that it will receive and effectually retain the free end of several standard types of wiper arms which may be selectively connected to the wiper blade by the use of the improved clip.

More specifically, it is an object of this invention to provide a box-like clip or connector having its ends preferably fastened to the back of the wiper blade and having its top formed with a plurality of openings for the reception of conventional wiper arms of more than one type; and comprising a spring member disposed within the connector and adapted to prevent accidental removal of the end of a wiper arm inserted in the selected opening of the clip.

Recommended embodiments of the invention are illustrated in the accompanying drawings, but it will be understood that the structural details of the clips or connectors shown and described herein may be varied without departing from the essence of this invention as defined in the appended claims. In the drawings, Fig. 1 is a fragmentary plan view of a wiper blade with a preferred form of the improved clip attached thereto;

Fig. 2 is a side elevation of Fig. 1;

Fig. 3 is a transverse section on line 3—3 of Fig. 2;

Figs. 4, 5 and 6 are central longitudinal sections through the wiper blade and the attached clip, respectively indicating the manner in which the ends of the stud-type arm, the pin-type arm, and the hook-type arm are removably connected to the clip;

Fig. 7 is a view similar to Fig. 1 showing a modified form of clip;

Fig. 8 is a side elevation of Fig. 7;

Fig. 9 is a section on line 9—9 of Fig. 8; and

Figs. 10, 11 and 12 are central longitudinal sections through the blade and clip of Figs. 7 to 9 respectively indicating the manner in which the ends of the hook-type arm, the stud-type arm, and the pin-type arm are removably connected to the modified form of clip.

In the particular embodiment chosen for the purpose of illustration in Figs. 1 to 6 inclusive, the improved clip comprises a box-like member, preferably made in one piece by stamping and bending a metal sheet to form a connector having ends 11 and 12, a top generally indicated at 13, and sides 14 and 15 extending from end to end of the device. It will be understood that the sides and ends of the clip may be bent downwardly from the top part to form the box-like structure. The ends 11 and 12 are respectively provided with bottom tabs 16 and 17, which pass through and are crimped beneath suitable openings in the metal shell or backing 18 of the wiper blade 19, to secure the clip to the blade, but other means of fastening the parts together may obviously be provided. It will also be understood that the flexible rubber wiper blade 19 may be of any desired form or configuration and may be held in the shell or backing 18 in any desired manner, inasmuch as the particular structure of these elements is immaterial to this invention.

The top of the connector is provided with openings 20 and 21, adjacent the ends 11 and 12 respectively, the transverse opening 21 communicating with downwardly extending notches or slots 22 in the sides 14 and 15. A portion 23 of the top 13 bridges the space between the opening 21 and the clip end 12. The top preferably has another opening 24 spaced inwardly from the notched opening 21, 22.

Intermediate the openings 20 and 24, the top of the clip is curved or bowed downwardly at 25, and the inward side of said bowed portion is provided with an aperture 26 therethrough. A leaf-type spring 27 is disposed within the clip or connector with its central portion resting on the blade back 18, as best shown in Figs. 4 to 6. One end of said spring is looped at 28 to provide an end portion 29 extending upwardly and inwardly of the box-like clip and normally engaging the bottom of the bowed or depressed portion 25 of the clip top, as shown in Figs. 5 and 6. The opposite end of the spring is curved upwardly and inwardly and terminates in a reverse bight 30 which normally engages the underside of the top portion 23, with the bight projecting into the space between the notches 22, to provide a latch element as hereinafter described.

The spring is inserted within the clip or connector before the latter is attached to the wiper blade, and fits loosely therein, being held in position by the resilience of its respective rearwardly bent ends which yieldingly engage portions of the connector top, as aforesaid.

The clip is adapted to selectively receive and retain different types of conventional wiper arms. As shown in Fig. 4, the curved end 31 of a stud-type arm is inserted through the top opening 20 and between the depressed portion 25 of the clip top and the spring end 29, until the stud 32 engages in the aperture 26. Such engagement is yieldingly maintained by the spring end, as will be apparent.

As shown in Fig. 5, the end 33 of a pin-type wiper arm is attached to the clip by inserting its cross pin 34 into the transverse opening 21 and the side slots 22, beneath the latch element 30 of the opposite end of the spring 27. It is apparent that the latch will yield upon insertion of the pin 34, and will spring back to normal position where it obstructs accidental removal of the pin from the slots 22.

As shown in Fig. 6, the end 35 of a hook type arm is applied to the connector by inserting its hook 36 downwardly through the top opening 24 and then upwardly through the aperture 26, where it is releasably retained in operative position until the wiper arm is swung over the clip to release the hook from engagement in said openings.

In the modified form of clip illustrated in Figs. 7 to 12 inclusive, the clip structure is similar to that heretofore described in connection with Figs. 1 to 6, except that the top opening 24 is omitted, and the side notches or slots 41 are inclined (Fig. 8) rather than vertical (Fig. 3). In this form, the respective sides of the clip may have central openings 42 and 43, to lighten the weight of the structure and facilitate manufacture.

In the modified arrangement, the spring member 44 is bowed upwardly at 45 intermediate its ends, said upwardly bowed portion normally engaging the downwardly bowed or depressed portion 46 of the clip top, as shown in Figs. 9 and 10. One end of the spring engages the blade back and one end of the clip, as shown at the left of Fig. 10, for example. The opposite end of the spring is reversely curved to provide a latch 47, essentially similar in form and purpose to the latch 30 of Figs. 1 to 6.

In this arrangement, the curved end of the stud-type arm is inserted as previously described, and held in attached position between the upwardly bowed portion 45 of the spring and the downwardly bowed portion 46 of the clip top, as shown in Fig. 11.

The end of the pin-type arm is also attached, essentially as described in connection with Fig. 5, by inserting the pin 48 into the inclined notches 41 and beneath the spring latch 47, as shown in Fig. 12.

The end of the hook-type arm is applied by inserting the hook into the transverse opening 49 which communicates with the inclined notches 41, and then upwardly through the opening 50 in the downwardly bowed or depressed portion of the clip top, as shown in Fig. 10.

Both forms of the clip or connector herein described are simple and economical to manufacture, easy to assemble and attach to the wiper blade, and capable of ensuring a quick and secure attachment of the selected form of arm end which is to be removably connected to the clip. The spring element within the clip not only prevents accidental removal of the stud-type and pin-type arm ends, but also yieldingly holds said arm ends in engagement with the connector, to prevent chattering or noise when the wiper blade is moved across the windshield by reciprocation of the wiper arm in the usual manner.

I claim:

1. A clip for removably connecting a windshield wiper arm to a wiper blade, comprising a box-like connector having a top, sides and ends, means on the connector for attaching it to the blade, said top having a depressed portion of arcuate form and said portion having an aperture therethrough, said top having an opening intermediate said depressed portion and one end of the connector, whereby the end of a stud-type arm may be inserted through said opening and under said depressed portion until its stud is received in said aperture, and a spring disposed within the connector and having an upwardly extending portion adapted to bear on said arm end yieldingly to retain the stud in said aperture, said spring extending longitudinally of the connector and having a central portion for normally engaging the wiper blade, and having a looped end forming said upwardly extending portion, said upwardly extending portion normally engaging the depressed portion of the top when the wiper arm is separated from the connector.

2. A clip for removably connecting a windshield wiper arm to a wiper blade, comprising a box-like connector having a top, sides and ends, means on the connector for attaching it to the blade, said top having a depressed portion of arcuate form and said portion having an aperture therethrough, said top having an opening intermediate said depressed portion and one end of the connector, whereby the curved end of a stud-type arm may be inserted through said opening and under said depressed portion until its stud is received in said aperture, and a spring disposed within the connector and having an upwardly extending portion adapted to bear on said arm end yieldingly to retain the stud in said aperture, said spring extending longitudinally of the connector and having spaced portions for normally engaging the wiper blade, said upwardly extending portion being disposed between said spaced portions and normally engaging the depressed portion of the top when the wiper arm is separated from the connector.

3. A clip for removably connecting a windshield wiper arm to a wiper blade, comprising a connector having top, side and end walls, means for attaching the connector to a wiper blade with the top wall spaced from the back of the blade, said top wall having flat portions adjacent its ends and an intermediate depressed portion curving downwardly in a longitudinal direction, said curved portion being imperforate for a substantial part of its length and having an aperture therethrough, one of said flat wall portions having an opening therethrough, whereby the stud of a stud-type wiper arm inserted in said opening may be engaged in said aperture, and a leaf spring extending longitudinally of the connector and having a central portion for normally engaging the wiper blade and upwardly curved ends engaging the respective end walls of the connector, one of said spring ends having a rearward extension normally underlying and engaging said downwardly curved wall portion.

4. A clip for removably connecting a windshield wiper arm to a wiper blade, comprising a connector having top, side and end walls, means for attaching the connector to a wiper blade with the top wall spaced from the back of the blade, said top wall having flat portions adjacent its ends and an intermediate depressed portion curving downwardly in a longitudinal direction, said curved portion being imperforate for a substantial part of its length and having an aperture therethrough, one of said flat wall portions having an opening therethrough, whereby the stud of a stud-type wiper arm inserted in said opening may be engaged in said aperture, and a leaf spring extending longitudinally of the connector and having a central portion for normally engaging the wiper blade and upwardly curved ends engaging the respective end walls of the connector, one of said spring ends having a rearward extension normally underlying and engaging said downwardly curved wall portion, the other of said spring ends having a reverse bight portion engaging the under side of the top wall remote from said downwardly curved portion.

5. A clip for removably connecting a windshield wiper arm to a wiper blade, comprising a connector having top, side, and end walls, means for attaching the connector to a wiper blade with the top wall spaced from the back of the blade, said top wall having flat portions adjacent its ends and an intermediate depressed portion curving downwardly in a longitudinal direction, said curved portion being imperforate for a substantial part of its length, and having an aperture therethrough, one of said flat wall portions having an opening therethrough whereby the stud at the curved end of a stud-type wiper arm inserted in said opening may be engaged in said aperture with the curved end of the arm bearing against said depressed portion, and a leaf spring extending longitudinally of the connector and having a central portion for normally engaging the wiper blade, a portion of said spring adjacent one end thereof normally underlying and engaging said downwardly curved wall portion and the other end of the spring having a reverse bight portion engaging the underside of the top wall remote from said downwardly curved portion.

ISRAEL NESSON.

References Cited in the file of this patent

UNITED STATES PATENTS

| Number | Name | Date |
|---|---|---|
| 2,172,795 | Foster | Sept. 12, 1939 |
| 2,234,791 | Zaiger | Mar. 11, 1941 |
| 2,252,510 | Horton | Aug. 12, 1941 |

FOREIGN PATENTS

| Number | Country | Date |
|---|---|---|
| 615,500 | Great Britain | Jan. 6, 1949 |